Patented Oct. 19, 1948

2,451,590

UNITED STATES PATENT OFFICE 2,451,590

PROCESS OF FORMING A LUMINESCENT SCREEN

Stephen Tidik, Passaic, and Albert Steadman, Upper Montclair, N. J., assignors to Allen B. Du Mont Laboratories, Inc., Passaic, N. J., a corporation of Delaware No Drawing. Application July 6, 1945,
Serial No. 603,584

7 Claims. (Cl. 117—33.5)

This invention relates to improvements in depositing luminescent material on a solid surface to form a luminescent screen and to the method of forming such screens. In carrying out the invention, particles of luminescent material are settled through a colloidal medium such as silicic acid in a solution containing an ionizable salt so that it is an electrolyte.

The formation of an undesirable ring when luminescent material of minute particle size was permitted to settle through an aqueous medium has been obviated by this invention by using certain easily volatilized salts, such as ammonium salts, for example, to bring about the formation of a colloidal medium. In previous methods, the high concentration of the alkali metals in direct contact with the luminescent salt, as in dusting a luminescent salt upon a layer of waterglass, or spraying the luminescent salt with the binder of such compounds, produced a deleterious effect because of the high concentration of the alkali metal in direct contact with the luminescent salt.

By the present invention any and all types of luminescent material irrespective of the particle size can be deposited without forming a ring. All types of screen material, irrespective of particle size, can be deposited in frusto-conical or other glass blanks without producing an undesirable heavy ring of luminescent salt which would limit the usable screen area that is present when other electrolytes heretofore used were employed.

With this invention a highly efficient luminescent screen is provided having great adhesion between particles and to the screen foundation so that the electrolyte from which it settles may be decanted manually or by mechanical means in a minimum amount of time. The screen that is produced has high secondary electron emitting properties when excited by corpuscular energy since impediments to the luminous properties of the luminescent material are removed.

In carrying out the invention a luminescent screen is settled with a thin transparent film thereon that can be easily dried which acts as a protective coating over the crystals of the luminescent salt and prevents them from slipping, sliding or rolling when the electrolyte is being decanted. The crystals are also provided with a colloidal coating which enables them to adhere to the rounded area of a blown-face blank or container and not slide to the lower portion and accumulate there as a heavy ring.

Also, the time necessary to settle a luminescent screen in either a blown-face blank or a flat-face blank of the cathode-ray tube variety is decreased and at the same time a luminescent material is deposited on a supporting foundation upon which the material is more firmly bound to the foundation than heretofore. This invention can also be used with flat-face variety blanks with distinct advantages resulting from a considerable saving in time, labor and equipment.

In accordance with this invention, any desired luminescent material may be settled into contact with a screen foundation through a colloidal medium, so that the colloid produces a binding action on the particles and provides greater adhesion of the particles one with another and with the foundation. The luminescent crystals are caused to have a thin transparent colloidal coating upon them which is sufficient to prevent them from sliding from the curved area of the blank upon which they are deposited. The colloid forms a transparent, easily dried film over the settled particles of luminescent material which prevents them from rolling, sliding or slipping when the colloidal electrolyte is being removed.

These and other objects, features and advantages of this invention will become more apparent to those skilled in the art when taken in connection with the following description, the specific scope of our invention being set forth in the appended claims.

More particularly, in accordance with this invention, luminescent material of any particle size is settled through a colloid which may be formed, for example, by the reaction between:

a. Such ammonium compounds as $(NH_4)_2CO_3$, $(NH_4)_2SO_4$, $NH_4Cl$, $(NH_4)_2C_2O_4$, $(NH_4)_2HPO_4$ and $(NH_4)H_2PO_4$ and solutions of inorganic salts such as sodium waterglass, potassium waterglass, $Na_2SiO_3$ and $K_2SiO_3$, or organic salts such as ethyl silicate, and other salts or esters which contain the $SiO_2$ radical.

b. Such acids as $H_3PO_4$, $H_3BO_3$, and organic and inorganic salts which contain the $SiO_2$ radical in their composition.

c. Such bases as $LiOH$ and $NH_4OH$, etc., and the organic and inorganic salts which contain the $SiO_2$ radical in their composition.

d. Acid salts and other salts such as $NaHCO_3$, $Na_2HPO_4$, $K_2CO_3$, $KHCO_3$, $Li_2CO_3$, $Li_2C_2O_4$, Na, K and mono- and di-hydrogen phosphates and solutions of organic and inorganic salts which contain the $SiO_2$ radical in their composition.

e. Alcohols, ketones or other organic compounds and solutions of either the organic or inorganic salts containing the $SiO_2$ radical.

f. Any organic and inorganic compounds reacting with other salts of an organic or inorganic nature to form a colloidal medium.

We have found this method to be applicable in the manufacture of substantially all inorganic luminescent material screens where the luminescent material comprises a sulfide, oxide, tungstate, aluminate or silicate of one or more metals consisting of zinc, cadmium, beryllium, magnesium, manganese, calcium, strontium and others which are known to the art.

While it might be thought that the alkali metals, which are mentioned as compounds which react to form the colloid, would deleteriously affect the phosphorescent and fluorescent materials such as sulfides and silicates, and that the formation of a film would interfere with the corpuscular energy as provided in a cathode-ray tube from being fully absorbed by the particles of luminescent material, we have found that there is no perceptible injury to the luminescent screen or its function. Such deleterious effects do not occur with the low concentration of the soluble alkali metals and the short time of exposure of the luminescent materials to the compounds that are used, that may also contain the alkali. Also, during the processing of the screen, the film which is formed to act as a preventative to disturbances of the luminescent material distribution, is dried at low temperatures, usually about 60° C. to 100° C.

In acordance with the present invention, the luminescent material is settled through a colloid which may contain an alkali metal in very small concentrations of 0.25% to 1% by weight of the total colloid. The concentration is to be varied in accordance with the luminescent screen material to be settled.

It has been found that the luminescent material is not only deposited on the curved area of the face of the cathode-ray tube and the colloid electrolyte is removed more rapidly after the phosphorescent or fluorescent material has settled through a colloid, but also that following the drying and baking steps, the screen is more firmly attached to the foundation and the luminescent salt is capable of greater light output than screens of the same luminescent salts deposited on the substrate of the cathode-ray tube by previous methods. In addition, it appears that some of the NaOH found in the reaction forming the colloid reacts with the surface layer or layers of glass to form a siliceous film which binds the screen to the glass foundation. This reaction which occurs with the glass foundation is, however, of such a minor amount that the physical appearance and strength of the glass are not affected to any perceptible degree. Furthermore, there is no deleterious effect upon the luminous screen material, but on the contrary there is an increase of luminous efficiency.

While particular colloids have been mentioned in describing details of the invention, it is to be understood that the organic and inorganic solutions mentioned above may be used with other organic or inorganic solutions in varying concentrations which may in combination form a colloid. While the invention has been found to be particularly useful for applying phosphorescent or fluorescent materials to cathode-ray tube surfaces, it will be understood that it is also suitable for the application of such materials for other uses such as depositing screens for luminescent lamps or electric discharge devices in general and that we do not wish to be limited to the particular use to which our improved product may be applied or to the specific materials utilized in practicing our invention except as set forth in the appended claims.

The following are given as specific examples of the invention:

Example I

A colloid is formed by using a 2.5% concentration of $(NH_4)_2CO_3$ in water containing not more than 0.005% of heavy metal such as lead, copper or silver, and 10% potassium waterglass. The proportion of ammonium carbonate to water is 2.5 to 97.5 by weight. The potassium waterglass is prepared by diluting a concentrated aqueous solution of it with distilled water. The materials for forming the colloid are introduced into the receptacle, such as a cathode-ray tube blank, upon the inner large end surface of which the luminescent screen material is to be applied.

The luminescent material is dispersed in distilled water and introduced into the colloid which had been formed. The amount of the luminescent material introduced may vary over a wide range depending upon the sort of such material used and the thickness of the screen that is desired. The time required for the luminescent material to settle varies from about 15 minutes to several hours, depending largely upon the size of the particles. After the particles settle the tube is slowly tilted to permit the liquid to flow off. The residual layer of screen material is dried by warm air and then baked at a temperature of about 350° C. for half an hour to dehydrate any residue which might remain.

Example II 150 cc. of a 1% solution of potassium waterglass and 300 cc. of a 2.5% solution of $(NH_4)_2CO_3$ is introduced into a five-inch frusto-conical cathode-ray tube envelope. The colloid is permitted to form for about an hour. The luminescent salt is dispersed in 100 cc. of a very weak solution of potassium waterglass and added to the colloid within the envelope. The tube is permitted to remain undisturbed for about an hour, whereupon the screen material settles out and the liquid is poured off by slowly tilting the tube. The screen that is thus formed is dried by warm air and then baked at about 350° C. to remove all of the volatile material.

While the formation of a colloid by means of $(NH_4)_2CO_3$ and potassium waterglass has been mentioned in describing details of the present invention, it has been found that all of the organic and inorganic solutions mentioned previously may be used with other aforesaid organic or inorganic solutions in varying concentrations which may in combination form a colloid. Thus while the invention has been described with particular reference to the application of phosphorescent or fluorescent materials to cathode-ray tube surfaces, it will be understood that this invention is likewise suitable for the application of such materials for other uses such as depositing screens for luminescent lamps or electric discharge devices in general and that we do not wish to be limited to the particular use to which our invention may be applied or to the specific materials utilized in practicing our invention except as set forth in the appended claims.

What is claimed is:

1. The process of forming a luminescent screen on a solid surface, which comprises the steps of providing a colloidal silica gel, distributing an aqueous dispersion of luminescent material upon said colloidal silica gel, allowing said luminescent material to settle through said colloidal silica gel and deposit upon said surface, and removing all of said colloidal silica gel except a residuum that is held between particles of said material.

2. The process of forming a luminescent screen on a solid surface, which comprises the steps of providing a colloidal silica gel, distributing an aqueous dispersion of luminescent material upon said colloidal silica gel, allowing said luminescent material to settle through said colloidal silica gel and deposit upon said surface, removing all of said colloidal silica gel except a residuum that is held between particles of said material, and drying said formed luminescent screen with a low pressure stream of warm air.

3. The process of forming a luminescent screen on a solid surface, which comprises the steps of providing a colloidal silica gel, distributing an aqueous dispersion of particles of luminescent material upon said colloidal silica gel, allowing said luminescent particles to settle through said colloidal silica gel whereby their movement becomes retarded due to the viscosity of said colloidal silica gel and each particle of said luminescent material becomes coated with said colloidal silica gel during its passage through said colloidal silica gel thus improving the adhesion of said luminescent particles to said solid surface and developing sufficient adhesion to enable excess colloidal silica gel to be removed by decantation without removing said luminescent particles.

4. The process of forming a luminescent screen which comprises the steps of dispersing particles of luminescent material, distributing said dispersed particles over a colloidal silica gel and permitting said luminescent particles to settle through said colloidal silica gel thereby forming a very thin layer of said colloidal silica gel upon each particle of said luminescent material, then permitting a very thin layer of said colloidal silica gel to deposit on said settled luminescent material thereby enabling excess colloidal silica gel to be decanted without disturbing said luminescent material.

5. The process which comprises forming a colloidal silica gel above a solid surface, distributing an aqueous dispersion of particles of luminescent material upon said colloidal silica gel, allowing the particles of said luminescent material to settle evenly onto said solid surface and removing excess colloidal silica gel by decanting without disturbing said settled luminescent particles.

6. The process of preparing a luminescent screen upon a solid surface having an upwardly curved edge portion which comprises forming a colloidal silica gel, through which luminescent material can be settled, distributing a dispersion of particles of luminescent material upon said colloidal silica gel, permitting said particles of said luminescent material to settle upon said solid surface including said curved edge portion, and removing excess colloidal silica gel by decanting without disturbing said settled particles.

7. The process of preparing a luminescent screen on a solid surface having an upwardly curved portion along the edge thereof which comprises settling luminescent particles of screen material through a colloidal silica gel uniformly onto said solid surface, the edge thereof and said upwardly curved portion, said colloidal silica gel being adapted to prevent slippage of said settled particles along said steeply curved portions, whereby a thick peripheral ring of excess luminescent particles is avoided and a maximum of useful fluorescent area on said luminescent screen is provided.

STEPHEN TIDIK.
ALBERT STEADMAN.

REFERENCES CITED

The following references are of record in the file of this patent:

UNITED STATES PATENTS

| Number | Name | Date |
|---|---|---|
| 2,108,683 | Leverenz | Feb. 15, 1938 |
| 2,219,899 | Jenkins | Oct. 29, 1940 |
| 2,252,552 | Calbick et al. | Aug. 12, 1941 |
| 2,328,292 | Painter | Aug. 31, 1943 |
| 2,412,654 | Sadowsky | Dec. 17, 1946 |

FOREIGN PATENTS

| Number | Country | Date |
|---|---|---|
| 494,105 | Great Britain | Oct. 20, 1938 |